United States Patent
Tanaka

(10) Patent No.: US 8,582,336 B2
(45) Date of Patent: Nov. 12, 2013

(54) POWER SUPPLY CIRCUIT CAPABLE OF HANDLING DIRECT CURRENT AND ALTERNATING CURRENT AND POWER SUPPLY CONTROL METHOD

(75) Inventor: Masayasu Tanaka, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 289 days.

(21) Appl. No.: 13/027,947

(22) Filed: Feb. 15, 2011

(65) Prior Publication Data

US 2012/0001599 A1      Jan. 5, 2012

(30) Foreign Application Priority Data

Jun. 30, 2010   (JP) ................................ 2010-150453

(51) Int. Cl.
H02M 1/10        (2006.01)

(52) U.S. Cl.
USPC ................ 363/142; 363/89; 323/207; 307/72

(58) Field of Classification Search
USPC .............. 363/74, 89, 142; 323/222, 205, 207; 307/64, 65, 72
See application file for complete search history.

(56) References Cited

U.S. PATENT DOCUMENTS

| | | | | |
|---|---|---|---|---|
| 7,190,091 | B1 * | 3/2007 | Marshall | 307/26 |
| 7,598,703 | B2 * | 10/2009 | Zhang et al. | 320/107 |
| 7,705,562 | B2 * | 4/2010 | Takahashi et al. | 320/128 |
| 7,795,847 | B2 * | 9/2010 | Kort | 323/222 |
| 8,004,260 | B2 * | 8/2011 | Irving et al. | 323/282 |
| 2008/0265847 | A1 * | 10/2008 | Woo et al. | 323/206 |
| 2008/0316779 | A1 * | 12/2008 | Jayaraman et al. | 363/74 |
| 2009/0147553 | A1 * | 6/2009 | Ryu et al. | 363/65 |
| 2010/0182803 | A1 * | 7/2010 | Nan et al. | 363/21.02 |

FOREIGN PATENT DOCUMENTS

| | | |
|---|---|---|
| JP | 09-055882 | 2/1997 |
| JP | 2004-357408 | 12/2004 |
| JP | 2005-261118 | 9/2005 |
| JP | 2005-295733 | 10/2005 |
| JP | 2007-166783 | 6/2007 |
| JP | 2008-289334 | 11/2008 |
| JP | 2009-060683 | 3/2009 |
| JP | 2009-183110 | 8/2009 |

(Continued)

OTHER PUBLICATIONS

Japanese Patent Application No. 2010-150453, First Office Action, mailed May 10, 2011, (with English Translation).

(Continued)

Primary Examiner — Gary L Laxton
Assistant Examiner — Kyle J Moody
(74) Attorney, Agent, or Firm — Blakely, Sokoloff, Taylor & Zafman LLP

(57) ABSTRACT

According to one embodiment, a power supply circuit includes an input terminal, a rectifier circuit, a power factor improvement circuit, a DC/DC converter, and a control module. The DC/DC converter converts the level of a DC voltage output from the power factor improvement circuit. The control module determines on the basis of the output voltage of the rectifier circuit whether an input power supply supplied to the input terminal is AC or DC. The control module generates a DC power supply by use of the power factor improvement circuit and DC/DC converter when the input power supply is AC and generates a DC power supply by controlling the operation of the power factor improvement circuit and DC/DC converter according to the voltage of input DC power supply when the input power supply is DC.

6 Claims, 4 Drawing Sheets

(56) References Cited

FOREIGN PATENT DOCUMENTS

| | | |
|---|---|---|
| JP | 2009-284646 | 12/2009 |
| JP | 2010-041857 | 2/2010 |
| JP | 2010-130883 | 6/2010 |

OTHER PUBLICATIONS

Japanese Patent Application No. 2010-150453, First Office Action, mailed Oct. 4, 2011, (with English Translation).

* cited by examiner

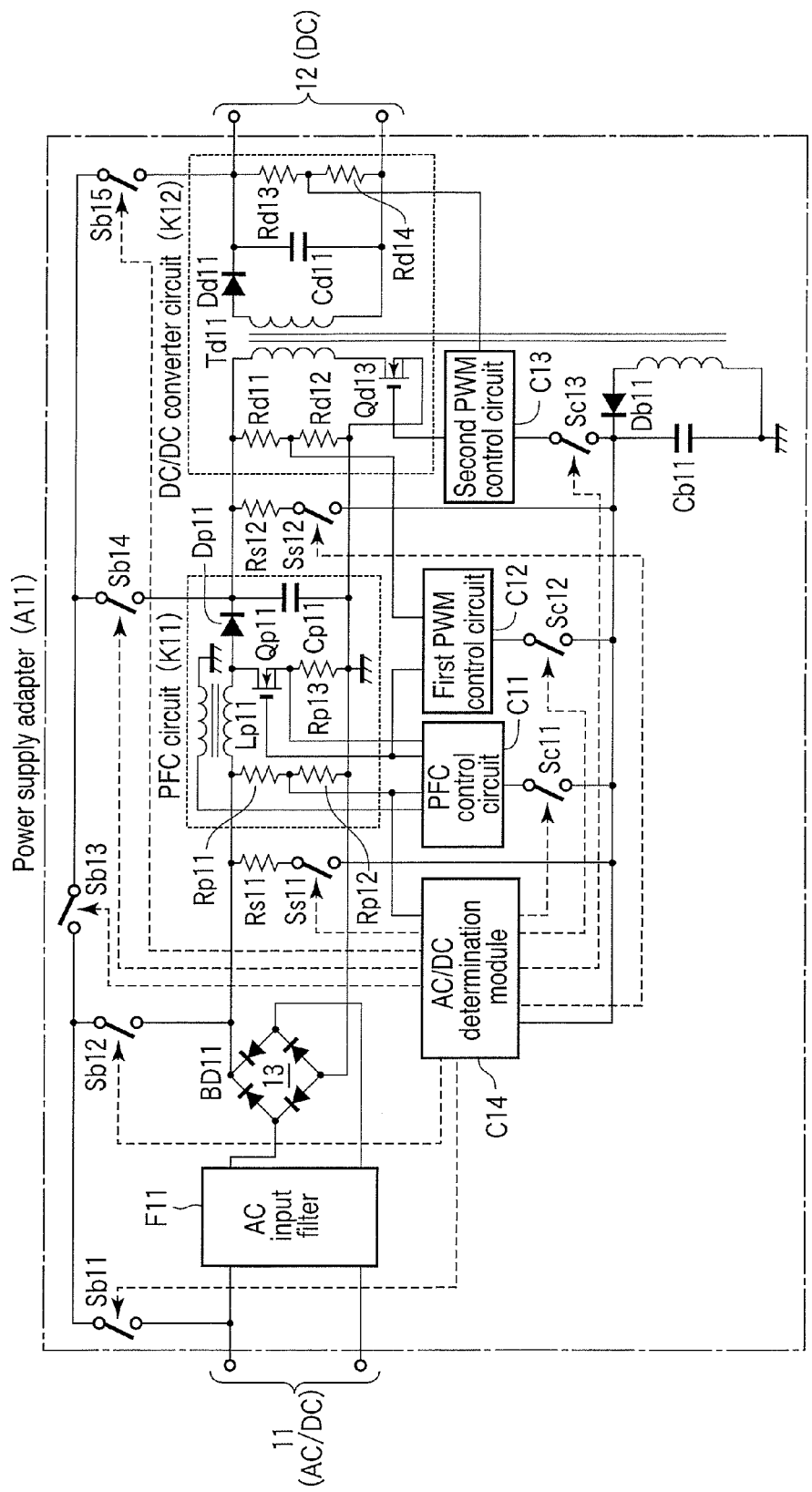
F I G. 1

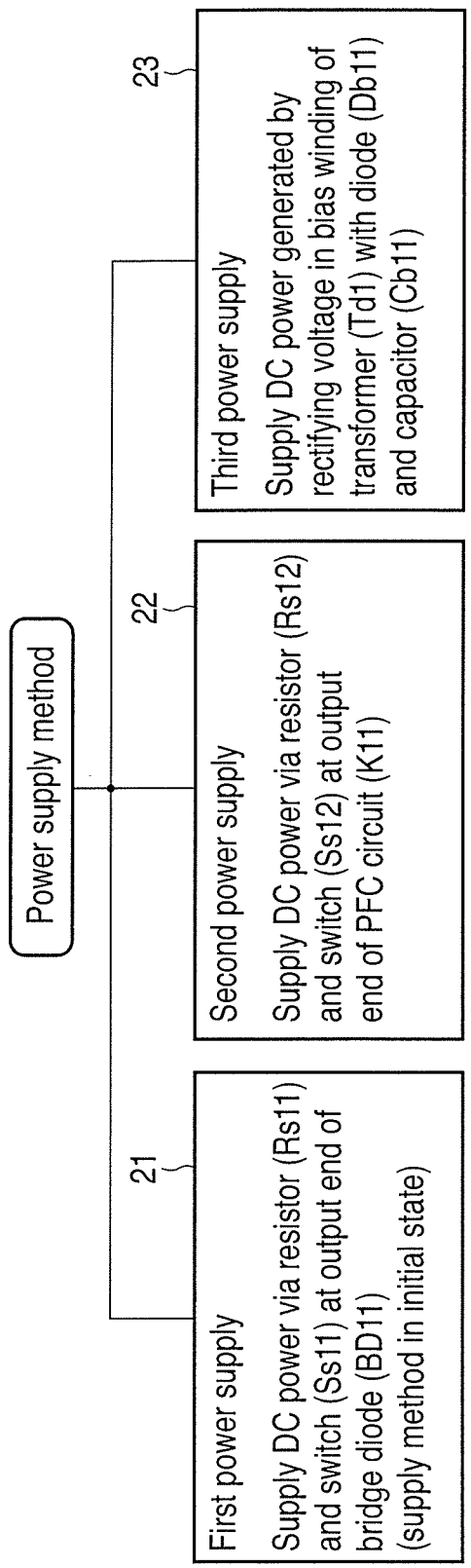
F I G. 2

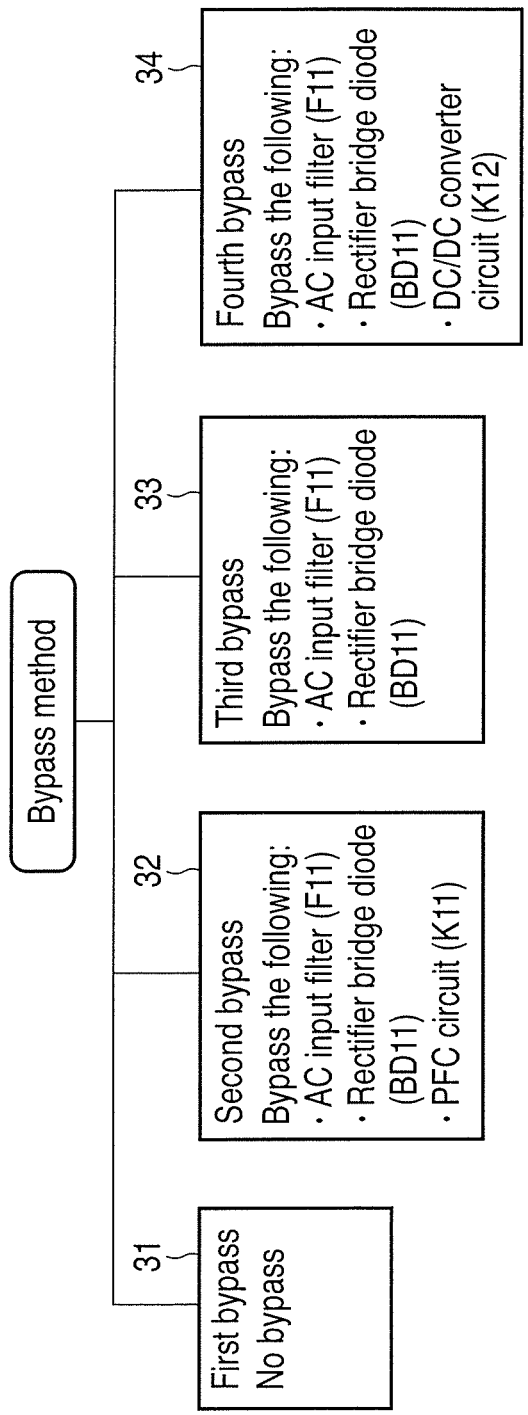
F I G. 3

POWER SUPPLY CIRCUIT CAPABLE OF HANDLING DIRECT CURRENT AND ALTERNATING CURRENT AND POWER SUPPLY CONTROL METHOD

CROSS-REFERENCE TO RELATED APPLICATIONS

This application is based upon and claims the benefit of priority from Japanese Patent Application No. 2010-150453, filed Jun. 30, 2010; the entire contents of which are incorporated herein by reference.

FIELD

Embodiments described herein relate generally to a power supply circuit of, for example, a personal computer, and a power supply control method.

BACKGROUND

Generally, an electronic device, such as a personal computer, operates from a direct-current power supply. Therefore, for example, a power supply adapter is used to convert commercial alternating current into direct current and supply the direct current to an electronic device.

To configure an electronic device to consume less energy, the supply of electricity to the electronic device from a power supply adapter is now being reexamined.

In recent years, electric power generated by solar power generation, wind power generation, or like is stored in a second battery temporarily. The direct current stored in the secondary battery is converted into alternating current by, for example, an inverter. The alternating current is then supplied to a distribution system. The conversion efficiency of the inverter has been improved but is not sufficient, leading to a conversion loss. In addition, the electric power converted into alternating current is converted into direct current by a power supply adapter to supply electricity to an electronic device. In this case, too, a conversion loss occurs. Therefore, it is desirable that the electric power generated from natural energy should be supplied in direct current to the electronic device.

Furthermore, an electronic device is used in, for example, a car, it is desirable that the direct current generated in the car should be used without the conversion of the direct current into alternating current. However, a power supply adapter serving as a power supply circuit used in an existing electronic device has only the function of converting alternating current into direct current. For this reason, it is difficult for the power supply adapter to handle a direct-current power supply. Accordingly, a power supply circuit and power supply control method which can output required direct current even when either alternating current or direct current is supplied have been desired.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is a circuit diagram showing the configuration of a power supply circuit according to an embodiment of the invention;

FIG. 2 shows the concept of a power supply method for each circuit shown in FIG. 1;

FIG. 3 shows the concept of a bypass method for each circuit shown in FIG. 1.

DETAILED DESCRIPTION

Figure 4:
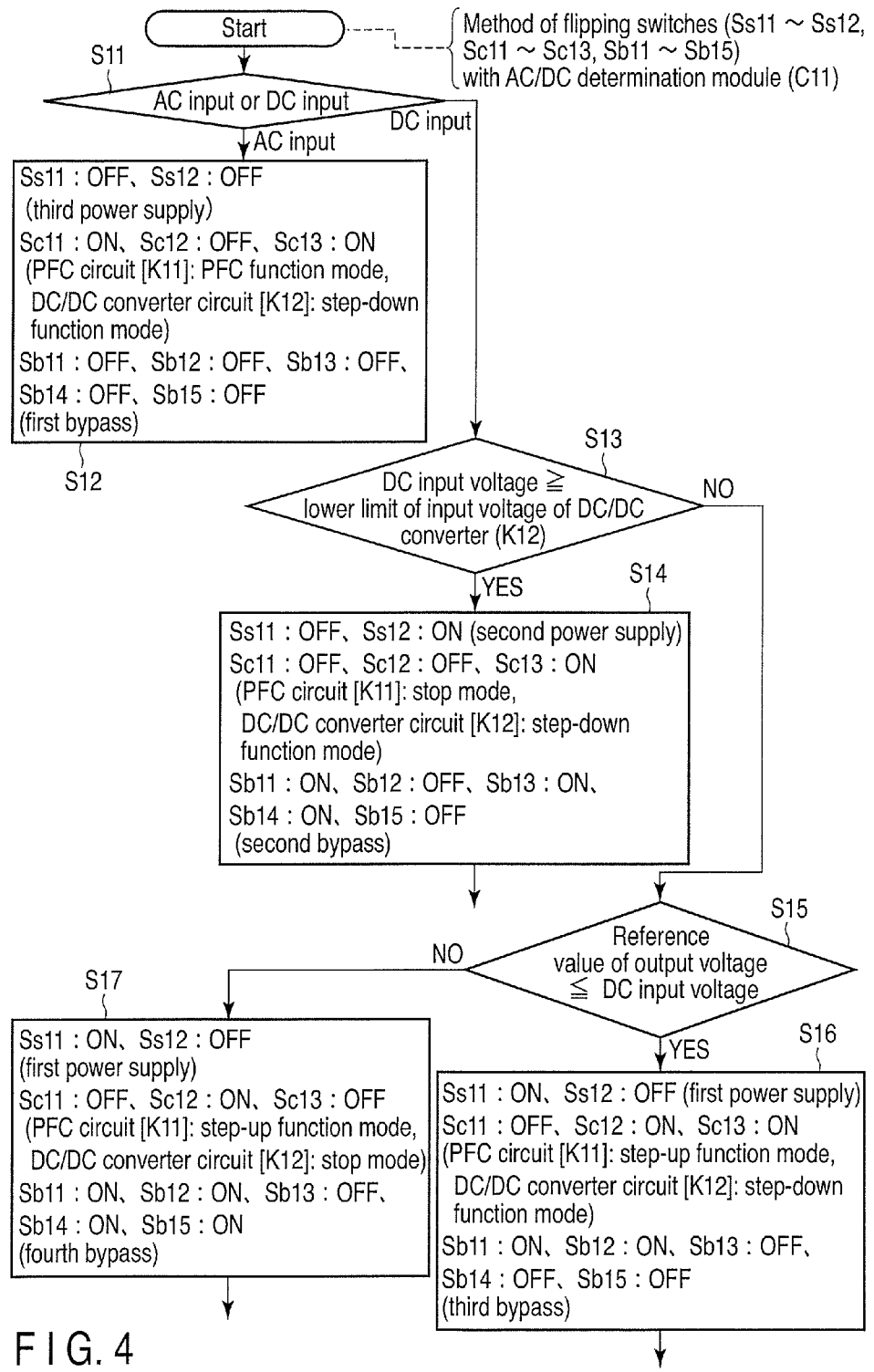
FIG. 4 is a flowchart to explain an operation of a power supply circuit shown in FIG. 1.

Various embodiments will be described hereinafter with reference to the accompanying drawings.

In general, according to one embodiment, a power supply circuit comprises an input terminal, a rectifier circuit, a power factor improvement circuit, a DC/DC converter, and a control module. Either an alternating-current (AC) power supply or a direct-current (DC) power supply is input to the input terminal. The rectifier circuit rectifies the alternating current supplied to the input terminal. The power factor improvement circuit improves the power factor of a voltage output from the rectifier circuit. The DC/DC converter converts the level of a DC voltage output from the power factor improvement circuit. The control module determines on the basis of the output voltage of the rectifier circuit whether an input power supply supplied to the input terminal is AC or DC. The control module generates a DC power supply by use of the power factor improvement circuit and DC/DC converter when the input power supply is AC and generates a DC power supply by controlling the operation of the power factor improvement circuit and DC/DC converter according to the voltage of input DC power supply when the input power supply is DC.

Hereinafter, the embodiment will be explained with reference to the accompanying drawings.

FIG. 1 shows a power supply circuit according to the embodiment. The power supply circuit is an example of a power supply adapter connected to the electronic device of, for example, a personal computer. However, the power supply circuit is not limited to a power supply adapter and may be incorporated in an electronic device. In addition, the electronic device is not restricted to a personal computer.

In FIG. 1, the power supply adapter A11 includes an input terminal 11 to which either an AC or a DC power supply is input and an output terminal 12 which outputs DC. An AC input filter F11 is connected to the input terminal 11. The AC input filter F11 removes noise in the AC supplied to the input terminal 11. A rectifier circuit 13, such as a bridge diode BD11, is connected to the output end of the AC input filter 11. When the AC power supply is input to the input terminal 11, the rectifier circuit 13 rectifies the AC.

A power factor correction (PFC) circuit K11 is connected to the output end of the rectifier circuit 13. The PFC circuit K11 comprises resistors Rp11 and Rp12 for dividing an input voltage, a choke coil Lp11, a switching transistor Qp11 connected to the primary winding of the choke coil Lp11, a current sensing resistor Rp13, and a diode Dp11 and a capacitor Cp11 constituting a rectifier.

A DC/DC converter circuit K12 is connected to the output end of the PFC circuit K11. The DC/DC converter circuit K12 comprises resistors Rd11 and Rd12 for dividing a voltage on the input side of the DC/DC converter circuit K12, a transformer Td11, a switching transistor Qd11 inserted in the primary winding of the transformer Td11, a diode Dd11 and a capacitor Cd11 connected to the secondary winding of the transformer Td11 and constituting a rectifier circuit, and resistors Rd13 and Rd14 for dividing a voltage on the output side of the DC/DC converter circuit K12.

A PFC control circuit C11 and a first pulse width modulation (PWM) control circuit C12 are connected to the PFC circuit K11. A first input end of the PFC control circuit C11 is connected to the connection node of resistors Rp11 and Rp12, a second input end of the PFC control circuit C11 is connected to the connection node of the switching transistor Qp11 and current sensing resistor Rp13, and a third input end of the PFC control circuit C11 is connected to an auxiliary winding of the choke coil Lp11. The output end of the PFC control circuit C11 is connected to the gate of the switching transistor Qp11.

The input end of a first PWM control circuit C12 is connected to the connection node of resistors Rd11 and Rd12 of the DC/DC converter circuit K12. The output end of the first PWM control circuit C12 is connected to the gate of the switching transistor Qp11.

The PFC circuit K11 is controlled by the PFC control circuit C11 and first PWM control circuit C12 in three operation modes: a PFC function mode, a step-up function mode, and a stop mode.

(PFC Function Mode)

The PFC function mode is for causing the PFC circuit K11 to operate as a PFC circuit (or perform self-control of the PFC circuit K11). The PFC control circuit C11 performs self-control of the PFC circuit K11 on the basis of the input voltage of the PFC circuit K11, the current of the choke coil Lp11, and the current of the switching transistor Qp11. Specifically, the PFC circuit K11 carries out the following operations:

(i) Turn on switching transistor Qp11.

(ii) Load data on a pulsating voltage input from the connection node of resistors Rp11 and Rp12. In addition, load data on current flowing in switching transistor Qp11 from current sensing resistor Rp13. On the basis of these data, turn off switching transistor Qp11.

(iii) Load data on current flowing in choke coil Lp11 from the auxiliary winding of choke coil Lp11. On the basis of the data, turn on switching transistor Qp11.

The operations in items (ii) and (iii) are repeated, thereby carrying out the PFC function mode.

(Step-Up Function Mode)

The step-up function mode is for causing the PFC circuit K11 to operate as a step-up circuit (or perform separate excitation of the PFC circuit K11). In the step-up function mode, the first PWM control circuit C12 loads data on an input voltage of the DC/DC converter circuit K12 from resistors Rd11 and Rd12 of DC/DC converter circuit K12. On the basis of the data, the first PWM control circuit performs separate excitation of (or PWM control) of PFC circuit K11.

(Stop Mode)

The stop mode stops the operation of the PFC circuit K11.

Switching between the three operation modes is performed by selectively turning on or off (or supplying or shutting off) the power supply of each of the PFC control circuit C11 and first PWM control circuit C12 by use of switches Sc11, Sc12.

The DC/DC converter circuit K12 is operated by a second PWM control circuit C13 in two modes, the step-up mode and stop mode.

(Step-Down Function Mode)

In the step-down function mode, the second PWM control circuit C13 acquires data on the output voltage of DC/DC converter circuit K12 from resistors Rd13 and Rd14 on the output side and, on the basis of the data, causes the DC/DC converter circuit K12 to operate as a step-down circuit.

(Stop Mode)

The stop mode stops the DC/DC converter circuit K12.

The step-down function mode and stop mode are switched by selectively turning on or off (or supplying or shutting off) the power supply of the second PWM control circuit C13 by use of switch Sc13.

The input end of an AC/DC determination module C14 is connected to the connection node of resistors Rp11 and Rp12 of the PFC circuit K11. The AC/DC determination module C14 determines on the basis of the voltage at the connection node of resistors Rp11 and Rp12 whether electricity supplied to the input terminal 11 is AC or DC. On the basis of the determination result, power is supplied to each of the circuits and control is performed so as to bypass unnecessary circuits according to the circuits to which power is not supplied and the type of input power supply.

Electric power is supplied to the AC/DC determination module C14, PFC control circuit C11, first PWM control circuit C12, and second PWM control circuit C13 by selectively flipping switches Ss11, Ss12, and Ss13.

The concept of a power supply method will be explained with reference to FIGS. 1 and 2.

(First Power Supply 21)

The first power supply 21 shown in FIG. 2 supplies power via a resistor Rs11 and a switch Ss11 connected to the output end of a bridge diode BD11. The first power supply 21 supplies power in the initial state.

(Second Power Supply 22)

The second power supply 22 supplies power via a resistor Rs12 and a switch Ss12 at the output end of the PFC circuit K11.

(Third Power Supply 23)

The third power supply 23 rectifies a voltage generated in the bias winding of a transformer Td1 with a diode Db11 and a capacitor Cb11, thereby generating DC.

The first to third power supplies 21, 22, 23 are selected by flipping switches Ss11, Ss12, Ss13 on the basis of the determination result at the AC/DC determination module C14.

(Bypassing Circuits)

Each of the AC input filter F11, bridge diode BD11, PFC circuit K11, and DC/DC converter circuit K12 is selectively operated, depending on whether the input power supply is AC or DC. Circuits that need not be operated are bypassed.

Accordingly, one end of a switch Sb11 is connected to the input end of the AC input filter F11. One end of a switch Sb12 is connected to the output end of the bridge diode BD11. One end of a switch Sb14 is connected to the output end of the PFC circuit K11. One end of a switch Sb15 is connected to the output end of the DC/DC converter circuit K12. The other end of switch Sb12 is connected to the other end of switch Sb11. The other end of switch Sb14 is connected to the other end of switch Sb15. A switch Sb13 is connected between the other end of switch Sb12 and the other end of switch Sb14.

Switches Sb11 to Sb15 are controlled in the following four ways. They are switched on the basis of the determination result of the AC/DC determination module C14, thereby bypassing the AC input filter F11, bridge diode BD11, PFC circuit K11, and DC/DC converter circuit K12.

FIG. 3 shows the concept of a bypass method based on the operating state of switches Sb11 to Sb15.

A first bypass 31 is in a state where there is no bypass. Therefore, all of switches Sb11 to Sb15 are turned off.

A second bypass 32 bypasses the AC input filter F11, rectifier bridge diode BD11, and PFC circuit K11. Therefore, switch Sb11 is turned on, switch Sb12 off, switch Sb13 on, switch Sb14 on, and switch Sb15 off.

A third bypass 33 bypasses the AC input filter F11 and rectifier bridge diode BD11. Therefore, switch Sb11 is turned on, switch Sb12 on, switch Sb13 off, switch Sb14 off, and switch Sb15 off.

A fourth bypass 34 bypasses the AC input filter F11, bridge diode BD11, and DC/DC converter circuit K12. Therefore, switch Sb11 is turned on, switch Sb12 on, switch Sb13 off, switch Sb14 on, and switch Sb15 on.

(Operation)

The operation of the power supply circuit shown in FIG. 1 will be explained with reference to FIG. 4.

In the initial state, only switch Ss11 is turned on and switches Ss12, Sc11 to Sc13, and Sb11 to Sb15 are turned off. Accordingly, only a DC determination module C14 is allowed to operate via resistor Rs11 and switch Ss11 serving as the first power supply 23.

In this state, when AC or DC is supplied to the input terminal 11, the AC or DC input is supplied via the AC input filter F11 to the bridge diode BD11. The output voltage of the bridge diode BD11 is supplied to the DC determination module C14 via resistor Rs11 and switch Ss11.

The DC determination module C14 determines whether the current supplied to the input terminal 11 is AC or DC on the basis of the voltage at the connection node of resistors Rp11 and Rp12 of the PFC circuit K11 (S11).

Specifically, the DC determination module C14 detects a change in the level of the input voltage for a specific length of time and, on the basis of the detection result, determines whether the current supplied to the input terminal 11 is AC or DC. The detection time is assumed to be, for example, 5 ms. The time 5 ms corresponds to a ¼ period when the frequency of the AC power supply is 50 Hz. If the input power supply is DC, the voltage at the connection node of resistors Rp11 and Rp12 is constant during the detection time. If the input power supply is AC, the voltage at the connection node of resistors Rp11 and Rp12 includes a pulsating component and therefore varies during the detection time. On the basis of the detection result, it is determined whether the input power supply is AC or DC.

(When the Input Power Supply is AC)

If the determination has shown that the input power supply is AC, the power supply adapter A11 is set to a first bypass 41, that is, a state where there is no bypass. Then, the third power supply 23 supplies power to each circuit. That is, the individual switches are set as follows.

Switch Ss11: off, Switch Ss12: off
Switch Sc11: on, Switch Sc12: off,
Switch Sc13: on
Switch Sb11 to switch Sb15: all off Therefore, the AC input filter F11, bridge diode BD11, PFC circuit K11, DC/DC converter circuit K12, PFC control circuit C11, first PWM control circuit C12, and second PWM control circuit C13 are operated. In this state, the PFC circuit K11 is operated in the PFC function mode and the DC/DC converter circuit K12 is operated in the step-down function mode. That is, the AC supplied to the input terminal is rectified by the bridge diode BD11 via the AC input filter F11. The power factor of the rectified output is controlled by the PFC circuit K11. The output voltage of the PFC circuit K11 is stepped down by the DC/DC converter circuit K12. The stepped-down voltage is output as a DC power supply at the output terminal 12.

(When the Input Power Supply is DC [1])

In step S11, if it has been determined that the input power supply is DC, the AC/DC determination module C11 controls the operation of each circuit on the basis of the lower limit data of the input voltage of the preset DC/DC converter circuit K12 and the reference value data of the output voltage of the power supply adapter A11.

Specifically, the DC voltage (DC input voltage) supplied to the input terminal 11 is compared with the lower limit data of the input voltage of the DC/DC converter circuit K12 (S13). As a result, if the DC input voltage is greater than or equal to the lower limit data of the input voltage of the DC/DC converter circuit K12, the PFC circuit K11 is brought into the stop mode and the DC/DC converter circuit K12 is set in the step-down function mode. In this case, the second power supply 22 supplies DC via resistor Rs12 and switch Ss12 to a circuit to be operated. A bypass is set to the second bypass 42 (S14).

Specifically, if the relationship between the DC input voltage and the lower limit of the input voltage of DC/DC converter circuit K12 satisfies the expression (DC input voltage≥lower limit of input voltage of DC/DC converter circuit K12), the individual switches are set as follows.

Switch Ss11: off, Ss12: on
Switch Sc11: off, Sc12: on, Sc13: on
Switch Sb11: on, Sb12: off, Sb13: on, Sb14: on, Sb15: off Therefore, the AC input filter F11, bridge diode BD11, and PFC circuit K11 are bypassed and the input DC power supply is stepped down by the DC/DC converter circuit K12 and the stepped-down voltage is output at the output terminal 12.

(When the Input Power Supply is DC [2])

In step S13, if the determination has shown that the relationship between the DC input voltage and the lower limit of the input voltage of DC/DC converter circuit K12 does not satisfy the expression (DC input voltage≥lower limit of input voltage of DC/DC converter circuit K12), it is determined whether the reference value of the output voltage of the power supply adapter A11 is less than or equal to the DC input voltage (that is, the reference value of the output voltage≤DC input voltage) (S15).

As a result, if the reference value of the output voltage of the power supply adapter A11 is less than or equal to the DC input voltage (that is, reference value of output voltage≤DC input voltage<lower limit of input voltage of DC/DC converter circuit K12), the PFC circuit K11 is set in the step-up function mode and the DC/DC converter circuit K12 is set in the step-down function mode and then operated (S16). In this case, the first power supply 21 supplies power to a circuit to be operated. A bypass is set to the third bypass 43.

That is, if (reference value of output voltage≤DC input voltage<lower limit of input voltage of DC/DC converter circuit K12), the individual switches are set as follows.

Switch Ss11: on, Ss12: off
Switch Sc11: off, Sc12: on, Sc13: on
Switch Sb11: on, Sb12: on, Sb13: off, Sb14: off, Sb15: off Therefore, the AC input filter F11 and bridge diode BD11 are bypassed. As described above, the first PWM control circuit C12 performs separate excitation control (PWM control) of the PFC circuit K11, causing the PFC circuit K11 to function as a step-up circuit. The DC voltage stepped up by the PFC circuit K11 is stepped down by the DC/DC converter circuit K12. The stepped-down voltage is output at the output terminal 12.

(When the Input Power Supply is DC [3])

In step S15, if the determination has shown that the reference value of the output voltage is higher than the DC input voltage, the PFC circuit K11 is set in the step-up function mode and the DC/DC converter circuit K12 is set in the stop mode (S17). In this case, the first power supply 21 supplies power to a circuit to be operated. A bypass is set to the fourth bypass 34.

That is, if (reference value of output voltage>DC input voltage), the individual switches are set as follows.

Switch Ss11: on, Ss12: off
Switch Sc11: off, Sc12: on, Sc13: on
Switch Sb11: on, Sb12: on, Sb13: off, Sb14: on, Sb15: on Therefore, the AC input filter F11, bridge diode BD11, and DC/DC converter circuit K12 are bypassed. As described above, the first PWM control circuit C12 performs separate excitation control (PWM control) of the PFC circuit K11, causing the PFC circuit K11 to function as a step-up circuit. The DC voltage stepped up by the PFC circuit K11 is output at the output terminal 12.

In the above explanation, the determination in step 13 has been made first. Then, the determination in step 15 has been made. However, the embodiment is not limited to this. For instance, the determination in step S15 may be made first, followed by the determination in step 13.

With the embodiment, the AC/DC determination module C14 determines whether the power supply supplied to the input terminal 11 is AC or DC and, if the input power supply is AC, the PFC circuit K1 is set in the PFC function mode and the DC/DC converter circuit K12 is set in the step-down function mode, thereby converting AC to DC, which is then output to the output terminal 12. If the input power supply is DC, the PFC circuit K11 is set in the stop mode or the step-up function mode according to the relationship between the DC input voltage and the lower limit of the input voltage of DC/DC converter circuit K12 and the relationship between the DC input voltage and the reference value of the output voltage and the DC/DC converter circuit K12 is set in the step-down function mode or the stop mode, thereby converting the DC input into a required DC, which is then output to the output terminal 12. Accordingly, even if a power supply supplied to the power supply adapter A11 is AC or DC, the required DC can be supplied to an electronic device. Therefore, since a required DC power supply can be generated without the conversion of a DC power supply generated by use of natural energy or a DC power supply generated in a car into an AC power supply, a DC power supply for an electronic device can be generated with a reduced conversion loss.

The power supply adapter A11 of the embodiment incorporates the PFC circuit K11 of the step-up circuit type and can generate a DC power supply necessary for the operation of an electronic device even if either AC or DC is supplied to the input terminal 11. Therefore, there is no need to prepare a plurality of power supply adapters corresponding to an AC input and various DC inputs. Accordingly, one power supply adapter A11 enables an AC power supply and a DC power supply to be input, which makes it possible to make the power supply adapter or electronic device smaller in size and easier to use.

When DC is supplied to the input terminal 11, use of the PFC circuit K11 in the step-up function mode enables the DC/DC converter K12 to operate even on a voltage less than the input lower limit of the DC/DC converter K12.

In addition, when DC is supplied to the input terminal 11, the AC input filter F11, bridge diode BD11, PFC circuit K11, and DC/DC converter circuit K12 are selectively bypassed on the basis of input-output conditions, which enables the conversion efficiency of the DC power supply to be improved and the power-saving effect to be increased.

Furthermore, both the AC power supply and DC power supply use the PFC circuit K11 and DC/DC converter circuit K12 on the basis of input-output conditions of the AC power supply and DC power supply supplied to the input terminal 11, which enables the number of parts to be decreased, the device to be made smaller in size, and costs to be decreased.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A power supply circuit comprising:
   an input terminal to which either an alternating current (AC) power supply or a direct current (DC) power supply is input;
   a rectifier circuit coupled to the input terminal;
   a power factor improvement circuit supplied with a voltage output from the rectifier circuit;
   a DC/DC converter which converts a level of a DC voltage output from the power factor improvement circuit;
   a determination module which determines based on an output voltage of the rectifier circuit whether an input power supply supplied to the input terminal is AC or DC;
   a first controller which operates the power factor improvement circuit in a power factor improvement mode when the input power supply which is AC is determined by the determination module; and
   a second controller which operates the power factor improvement circuit in a stop mode or in a step-up mode, based on an input voltage of the DC/DC converter, when the input power supply which is DC is determined by the determination module.

2. The power supply circuit of claim 1, wherein the determination module stops the second controller and operates the first controller, when the input power supply which is AC is determined by the determination module, and
   wherein the determination module stops the first controller and operates the second controller, when the input power supply which is DC is determined by the determination module.

3. The power supply circuit of claim 1, wherein the determination module operates the DC/DC converter, when the input power supply which is AC is determined by the determination module, and the DC/DC converter is operated in a step-down mode.

4. The power supply circuit of claim 1, wherein when the input power supply is DC and a voltage of the DC power supply is greater than or equal to a lower limit of an input voltage of the DC/DC converter, the determination module sets the power factor improvement circuit into the stop-mode by the first controller, and the DC/DC converter is operated in a step-down mode.

5. The power supply circuit of claim 1, wherein when the input power supply is DC, a voltage of the DC power supply is less than a lower limit of an input voltage of the DC/DC converter, and greater than or equal to a reference voltage of an output voltage of the power supply circuit, the determination module operates the power factor improvement circuit in the step-up mode, and operates the DC/DC converter in a step-down mode.

6. The power supply circuit of claim 1, wherein when the input power supply is DC, a voltage of the DC power supply is less than a lower limit of an input voltage of the DC/DC converter, and is less than a reference voltage of an output voltage of the power supply circuit, the determination module operates the power factor improvement circuit in the step-up mode, and sets the DC/DC converter into the stop mode.

* * * * *